Patented Nov. 17, 1931

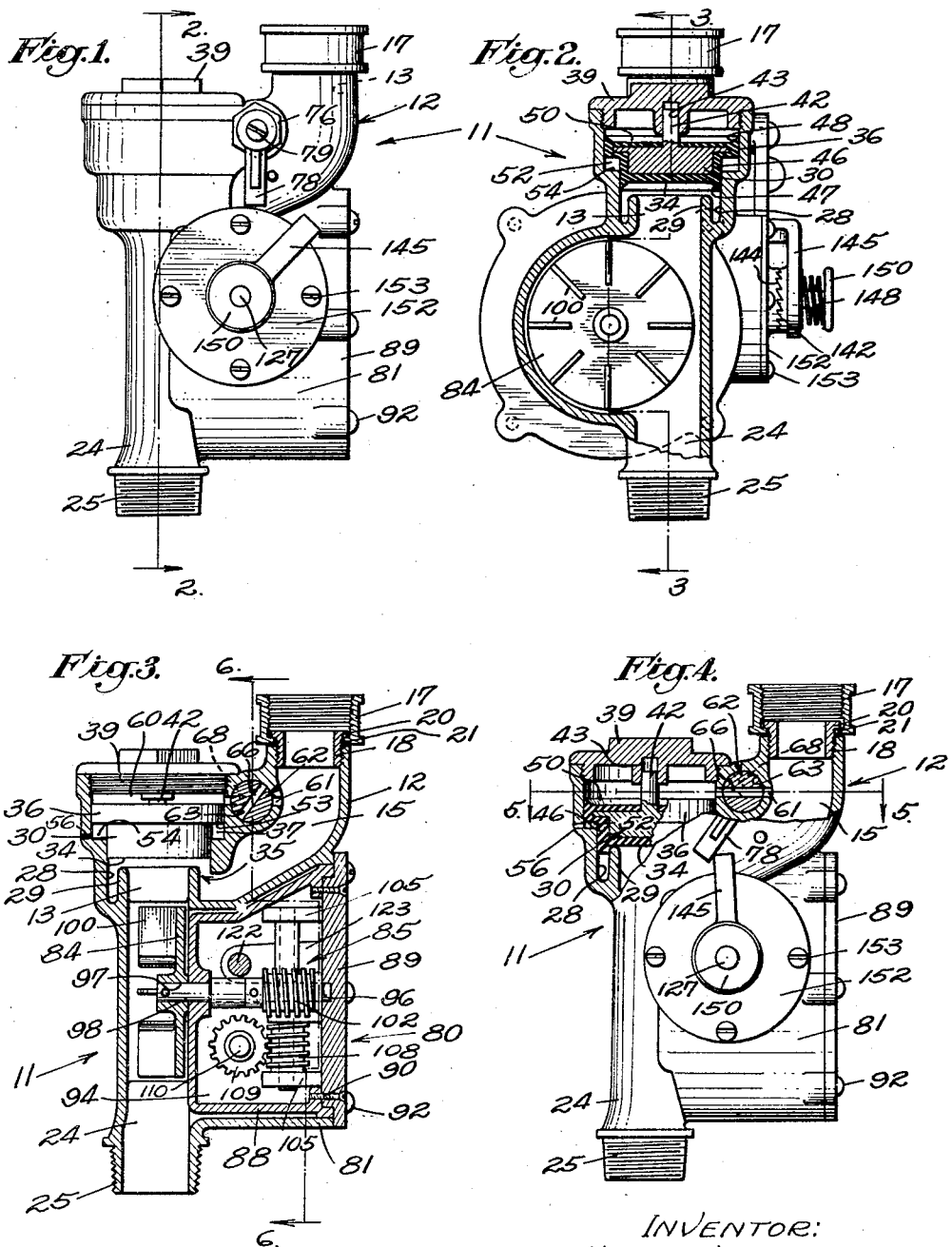

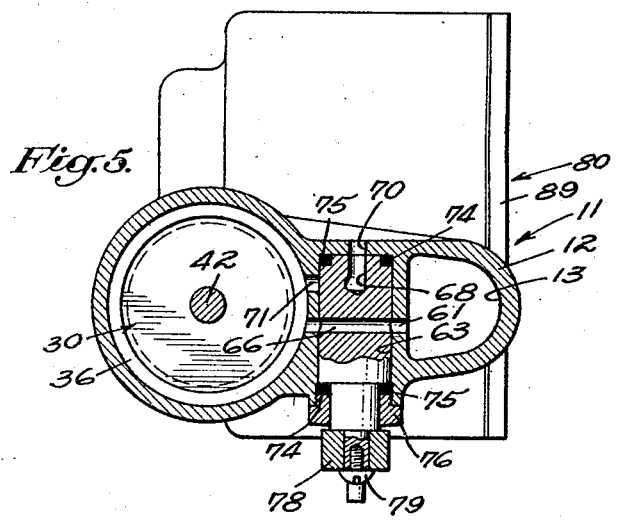
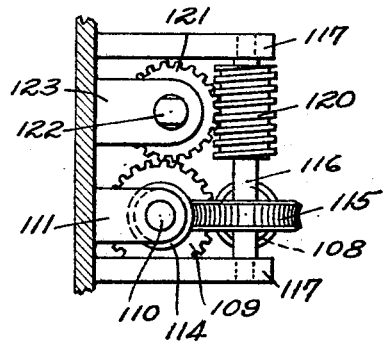
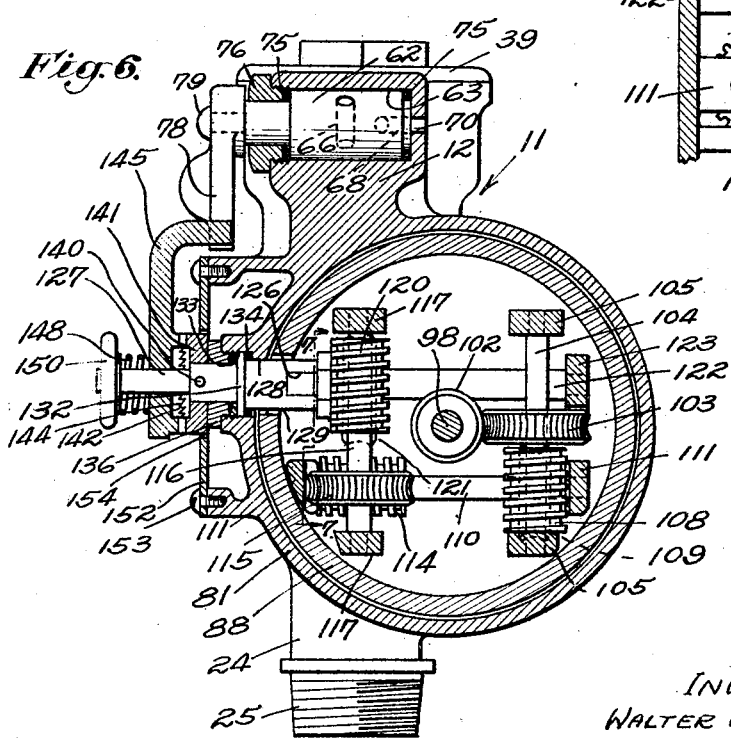

1,832,156

UNITED STATES PATENT OFFICE

WALTER VAN E. THOMPSON, OF LOS ANGELES, CALIFORNIA, ASSIGNOR TO THOMPSON MANUFACTURING COMPANY, OF LOS ANGELES, CALIFORNIA, A CORPORATION OF CALIFORNIA

AUTOMATIC SHUT-OFF VALVE

Application filed October 12, 1929. Serial No. 399,224.

My invention relates to a novel type of valve which is adapted to automatically close after a predetermined amount of fluid has flowed therethrough. Valves of this type find particular utility in sprinkler and irrigation systems, where they are used as shut-off valves to automatically shut off the flow of water after a predetermined amount has been delivered to desired areas of application.

Shut-off valves for sprinkler systems employing a definite time means, such as a clock, for closing the valve have the disadvantage of closing the valve after a definite time regardless of whether or not the rate of flow through the valve has changed during the sprinkling period. Thus, it is possible to have the flow of water stopped during the sprinkling period and have the valve shut off after a definite time even though the desired amount of water has not flowed through the sprinklers.

It is an object of my invention to provide an automatic shut-off valve, the closing of which may only occur after a predetermined amount of fluid has passed therethrough.

Another object is to provide a valve of this class which is operated by the flow of fluid through the valve.

A further object is to provide a valve of this class in which the operating means for closing the valve is operated by the pressure of the fluid and the means for controlling the operating means is operated by the flow of fluid through the valve.

It is also an object to provide a novel mechanism in a valve of this class in which the flow of fluid through the valve rotates a turbine runner which causes the valve to be closed after a predetermined number of revolutions thereof.

Another object is to provide in a mechanism of the above class a fluid pressure operated main valve and a secondary valve operable to control the flow of fluid through the main valve operating mechanism so as to secure a rapid closure of the primary valve when a predetermined amount of fluid has flowed through the main valve.

It is also an object to provide a novel fluid pressure operating means for the main valve in which the pressure of the fluid may be used to open or close the valve.

Further objects and advantages of my invention are evidenced in the particular form of construction used in the preferred form of my device.

In the drawings:

Fig. 1 is an elevational view showing a preferred form of my device.

Fig. 2 is a sectional view taken on a plane indicated by the line 2—2 of Fig. 1.

Fig. 3 is a sectional view taken as indicated by the line 3—3 of Fig. 2.

Fig. 4 is a partly sectioned view of the device as shown in Fig. 1.

Fig. 5 is a sectional view taken on a plane indicated by the line 5—5 of Fig. 4.

Fig. 6 is a sectional view taken on planes indicated by the line 6—6 of Fig. 3.

Fig. 7 is a sectional view taken on a plane indicated by the line 7—7 of Fig. 6.

For the purpose of disclosing a simple embodiment of my invention, I show in the drawings an automatic shut-off valve 11 especially adapted for use with a sprinkling system. The body 12 of the valve 11 has a fluid passage 13 and is adapted for inclusion in a water conduit system by having the inlet end 15 of the passage 13 provided with a female hose coupling 17 swivelly secured to the body 12 by a sleeve 18 threaded in the inlet end 15 of the passage 13, the sleeve 18 having a flange 20 engaging a flange 21 on the coupling 17, and by having walls around the outlet end 24 of the passage 13 externally threaded to form a male hose coupling 25.

Formed in the body 12 and extending into a bore 28 in the fluid passage 13 is an annular ring which forms a circular valve seat 29. Slidable in the bore 28 is a circular valve member 30 having a primary face 34 which is subjected to the pressure of a fluid in the passage 13 and which engages the valve seat 29 to stop the flow of fluid through the passage 13 when the valve member 30 is moved relative to the body 12, the valve member 30 and valve seat 24 forming a main valve 35 of my invention, which is closed when the primary face 34 and the seat 29 are engaged. The valve member 30 has a flange 36 formed on one end, which flange 36 is slidable in a counterbore 37 in the body 12, the counterbore 37 being opened to the outside of the body 12 to permit installing of the valve member 30 and being normally closed by a cap 39 threaded in the counterbore 37.

The movement of the valve member 30 relative to the body 12 is guided by a pin 42 formed on the valve member 30 and slidable in an opening 43 in the cap 39. As best shown in Fig. 2, I prefer to cover the valve member 30 with a coating of flexible material such as rubber 46 and to bevel the rubber 46 around the periphery 47 of the primary face 34 and around the periphery 48 of a secondary face 50 opposite the primary face 34 so as to permit the pressure of the fluid on the beveled portions to press these portions outward and form a seal between the valve member 30 and the walls of the bore 28 and counterbore 37.

An annular space 52 is formed between a shoulder 53 formed on the valve member 30 by the flange 36 and a shoulder 54 on the body 12 between the bore 28 and the counterbore 37, which space 52 changes in size when the valve 35 is opened and closed. To allow any fluid or air which might be trapped in the space 52 to escape when the valve 35 is opened or closed, an opening 56 is provided in the body 12, which opening 56 connects between the space 52 and the exterior of the body 12.

It should be noted that the cap 39 closes the counterbore 37 and provides a cavity 60 in the body 12, the secondary face 50 of the valve member 30 forming one wall of the cavity 60 and being subjected to the pressure of a fluid which may be introduced into the cavity 60.

Since the area of the secondary face 50 is greater than the area of the primary face 34 due to the additional area provided by the flange 36, it is only necessary to subject the secondary face 50 to the same unit pressure as the primary face 34 in order to cause an unbalance of forces on the valve member 30 and close the valve 35. In order to introduce the fluid in the passage 13 into the cavity 60 and subject the secondary face 50 to the same unit pressure as the primary face 34 to move the valve member 30, I provide in the body 12 an opening 61, as shown in Figs. 3 to 5, which opening 61 communicates between the inlet 15 of the passage 13 and the cavity 60. Communication through the opening 61 is controlled by a cylindrical valve 62 rotatable in a cylindrical opening 63 in the body 12, the valve 62 having an opening 66 therethrough which may be aligned as shown in Fig. 4 with the opening 61, and which may be moved out of alignment as shown in Fig. 3 by rotating the valve 62 in the proper direction. The valve 62 is also provided with an opening 68 which is at an angle relative to the opening 66 so that when the valve 62 is turned to close communication between the cavity 60 and the passage 13, the opening 68 establishes communication between an opening 70 (Fig. 5) which communicates with the outside of the body 12 and an opening 71 communicating with the cavity 60. When this communication is established, the pressure in the cavity 60, and hence the pressure on the secondary face 50, is reduced to atmospheric, and since the primary face 34 is subjected to the pressure of the fluid in the passage 13, this causes a sufficient unbalance of forces on the valve member 30 to open the valve 35.

As best shown in Figs. 5 and 6, the valve 62 has annular grooves 74 at each end, in which grooves 74 packing 75 is compressed by a nut 76 threaded in the opening 63 so as to prevent leakage around the valve 62. An end of the valve 62 extends outward from the body 12 and is provided with an operating lever 78 secured thereto by screws 79.

In order to turn the lever 78 so as to move the valve 62 and allow fluid in the passage 13 to be introduced into the cavity 60 for closing the valve 35, I provide an actuating means 80, as shown in Fig. 3, which actuating means 80 is retained in a cylindrical housing 81 offset from the body 12 and formed integrally therewith. The actuating means 80 consists essentially of a turbine runner 84 rotated by fluid flowing through the passage 13 and a gear train 85 for reducing the speed of the runner 84 so that the valve 62 may be rotated after a predetermined number of revolutions of the runner 84. The actuating means 80 is removable as a unit from the body 12 and includes a gear case 88 adapted to fit into the housing 81, the gear case 88 having a flanged cover 89 which is secured to the gear case 88 by screws 90 and which is secured to the housing 81 by screws 92, the screws 92 being removed when it is desired to withdraw the actuating means 80 from the body 12. The gear case 88 provides an inner chamber 94 which retains lubricant therein and excludes moisture therefrom so as to lubricate and protect the gear train 85 which may be placed therein.

Journalled by an opening 96 in the cover 89 and by an opening 97 in a wall of the gear case 88 is a primary shaft 98 of the gear train 85. Secured to an end of the shaft 98 extending through the gear case 88 is the runner 84 which is positioned, due to the housing 81 being offset from the body 12, so that the impellers 100 on one side of the runner 84 are in the passage 13 and are moved by the fluid as it flows through the passage 13, thus rotating the runner 84.

As best shown in Figs. 3 and 6, the shaft 98 carries a worm 102 in the chamber 94, which worm 102 meshes with a worm gear 103 secured on a second shaft 104 journalled in legs 105 which project inwardly from the cover 89. Carried by the second shaft 104 is a second worm 108 which meshes with a worm gear 109 secured on a third shaft 110, also journalled by inwardly projecting legs 111 carried by the cover 89. As clearly shown in Figs. 6 and 7, a third worm 114 is secured to the third shaft 110 and meshes with a worm gear 115 on a fourth shaft 116 journalled by inwardly projecting legs 117 of the cover 89. Carried by the fourth shaft 116 is a fourth worm 120 which meshes with a worm gear 121 on a fifth shaft 122 journalled by projecting legs 123 of the cover 89. As best shown in Fig. 6, an end of the fifth shaft 122 is flattened and is engaged by a slotted opening 126 in the end of a shaft 127 which is rotatable in an opening 128 in the housing 81 and which extends through an opening 129 in the gear case 88, the slotted opening 126 in the shaft 127 being disengaged from the flattened end of the fifth shaft 122 when the actuating means 80 is removed from the housing 81.

A flange 132 on the shaft 127 extends into a counterbore 133 and is packed on either side by packing 134 held in place by a nut 136 threaded in the counterbore 133, thus preventing leakage around the shaft 127. Secured to the shaft 127 by a pin 140 is a circular ratchet plate 141 having teeth 142 engaging similar teeth 144 on an arm 145 rotatable on the shaft 127. The teeth 142 and 144 are normally held in engagement by a spring 148 on the shaft 127, which spring 148 is compressed between the arm 145 and a nut 150 threaded on the shaft 127. The arm 145 is made sufficiently long and is bent at the free end to engage the lever 78 of the valve 62 so as to turn the valve 62 when the arm 145 is rotated. A circular plate 152 is secured to the body 12 by screws 153 and has a central opening 154 in which the ratchet plate 141 is rotatable. The plate 152 may be marked with graduations to indicate the amount of fluid which may be passed through the valve 35 before it is automatically closed, if desired.

In one use of my device with a sprinkler system, the coupling 17 is attached to a water faucet so as to connect the shut-off valve 11 to a source of water, and a hose is connected to the coupling 25 so as to connect the valve 11 to a sprinkler system, and the water is then turned on. The arm 145 is manually moved outward on the shaft 127 by the operator, against the action of the spring 148, so as to disengage the teeth 142 and 144, and the arm 145 is then rotated to the right a predetermined amount depending on the amount of water which it is desired to pass through the valve 11, the greater the amount of water required the greater the rotation of the arm 145.

When the plate 152 is graduated, the arm 145 may be set opposite the graduation which indicates the amount of water which it is desired to pass through the valve 11. The valve 62 is then rotated by manually moving the lever 78 until the lever 78 is approximately in the position shown in Fig. 1, in which position the valve 62 has closed communication between the passage 13 and the cavity 60 and has established communication between the cavity 60 and the outside of the body 12. The pressure of the fluid in the passage 13 then forces the valve 35 open, expelling the water from the cavity 60 through the openings 71, 68, and 70 in a manner already described.

The opening of the valve 35 establishes communication between the inlet 15 and the outlet 24 of the passage 13 so that the water may flow from the source of supply to the sprinklers. The flowing of water through the passage 13 rotates the runner 84 as already explained, the speed of rotation of the runner being proportional to the rate of flow of the water through the passage 13 and the number of revolutions of the runner being determined by the quantity of water passed through the valve 11. The speed of rotation of the runner 84 is reduced through the gear train 85 so as to very slowly rotate the arm 145 in a leftward direction, as viewed in Figs. 1 and 4.

After the runner 84 has made a predetermined number of revolutions depending on the initial setting of the arm 145, the arm 145 engages the lever 78 and rotates it to a position as shown in Fig. 4, in which position the valve 62 has been rotated to close communication between the cavity 60 and the exterior of the body 12 and to establish communication between the cavity 60 and the passage 13. Water may then flow from the passage 13 through the openings 61 and 66 into the cavity 60 where the pressure thereof acts on the secondary face 50 and closes the valve 35 in a manner previously explained. This closes communication between the inlet 15 and the outlet 24 of the passage 13 and stops the flow of water to the sprinklers. Due to the cavity 60 being in communication with the inlet 15 of the passage 13, the valve 35 is held closed as long as pressure is maintained in the passage 13, and due to the stopping of the flow of water through the passage 13, the runner 84 is stopped from rotating. The valve 11 must then be reset before further operation can occur.

It should be noted that the valve 35 is closed only after a predetermined number of revolutions of the runner 84, or after a predetermined quantity of water has flowed through the passage 13, since the quantity of water is determined by the number of revolutions of the runner 84. The device of my invention is, therefore, operable to pass a definite quantity of water to the sprinkler regardless of whether the rate of flow of the water through the shut-off valve 11 is fast or slow and regardless of whether the flow of water is stopped and started during the sprinkling period.

My device is therefore advantageous over shut-off valves employing a definite time means for closing the valve since its operation is dependent on the quantity of water passed through the valve 11 rather than on the time which the valve 11 is open.

By providing a main valve 35, the opening and closing of which is controlled by a secondary valve 62, I am able to secure a rapid opening and closing of the main valve 35. If the main valve 35 were opened and closed directly by the actuating means 80 in a manner similar to that in which the valve 62 is moved, the valve 35 would open and close very slowly since the arm 145 is moved very slowly. This would mean that the closing of the main valve 35 would extend over a considerable period of time, and during this period the flow of water through the passage 13 and hence to the sprinklers would slowly diminish. The sprinklers would cease to function properly when the flow became small, and hence the sprinklers are inefficient. By providing a valve 35 which is closed by the pressure of the fluid in the opening 13, the valve is rapidly closed and inefficiency of the sprinklers is prevented.

It should be noted that my device includes essentially a body having the fluid passage therethrough and a main valve 35 in the passage for shutting off the flow of fluid therethrough.

The main valve 35 is operated by a fluid pressure operating means provided by the primary and secondary faces 34 and 50 on which the pressure of the fluid in the passage 13 and the pressure of the fluid in the cavity 60 may respectively act to move the valve member 30 and open and close the valve 35. The valve 62 controls the flow of fluid to the fluid pressure operating means of the main valve 35 and is actuated by the actuating means 80, the actuating means 80 being operated by the flow of fluid through the passage 13. It should be understood that I am not limited to the device which I have shown or to the use described, as various modifications can be made therein without departing from the spirit of my invention.

I claim as my invention:

1. In an automatic shut-off valve, the combination of: a body providing a fluid passage therethrough; a valve adapted when closed to stop the flow of fluid through said passage; means operable by the pressure of said fluid in said passage to close said valve and means operated by the flow of fluid through said valve for controlling said operating means.

2. In an automatic shut-off valve, the combination of: a body providing a fluid passage therethrough; a valve adapted when closed to stop the flow of fluid through said passage; and means operable by the pressure of fluid in said passage to close said valve after a predetermined amount of fluid has flowed through said passage.

3. In an automatic shut-off valve, the combination of: a body providing a fluid passage therethrough; a valve adapted when closed to stop the flow of fluid through said passage; operating means operable by the pressure of said fluid in said passage to close said valve; and means operable to control said operating means after a predetermined amount of fluid has flowed through said passage.

4. In an automatic shut-off valve, the combination of: a body providing a fluid passage therethrough; a valve adapted when closed to stop the flow of fluid through said passage; operating means operable by the pressure of said fluid in said passage to close said valve; and means operable by the flow of fluid through said passage to control said operating means after a predetermined amount of fluid has flowed through said passage.

5. In an automatic shut-off valve, the combination of: a body providing a fluid passage therethrough; a valve adapted when closed to stop the flow of fluid through said passage; operating means operable by the pressure of said fluid in said passage to close said valve; a turbine runner rotated by the flow of said fluid through said passage; and means operatively connecting said runner and said operating means for controlling said operating means after a predetermined amount of fluid has flowed through said passage.

6. In an automatic shut-off valve, the combination of: a body providing a fluid passage therethrough; a primary valve adapted when closed to stop the flow of fluid through said passage; operating means operable by the pressure of said fluid in said passage to close said valve; a secondary valve operable when opened to establish communication between said passage and said operating means; and means operable by the flow of said fluid in said passage to open said secondary valve after a predetermined amount of fluid has flowed through said passage.

7. In an automatic shut-off valve, the combination of: a body providing a fluid passage therethrough; a primary valve adapted when closed to stop the flow of fluid through said passage; operating means operable by the pressure of said fluid in said passage to close said valve; a secondary valve operable when opened to establish communication between said passage and said operating means; a turbine runner rotated by the flow of fluid through said passage; and means operatively connecting said runner and said secondary valve for opening said valve after a predetermined amount of fluid has flowed through said passage.

8. In an automatic shut-off valve, the combination of: a body providing a fluid passage therethrough; a primary valve adapted when closed to stop the flow of fluid through said passage; operating means operable by the pressure of said fluid in said passage to close said valve; a secondary valve operable when opened to establish communication between said passage and said operating means; a turbine runner rotated by the flow of fluid through said passage; and gear means operatively connecting said runner and said secondary valve for opening said secondary valve after a predetermined number of revolutions of said runner.

9. In an automatic shut-off valve, the combination of: a body providing a fluid passage therethrough and a cavity therein; a valve seat in said fluid passage; a valve member carried by said body and slidable relative thereto; a primary valve face on one side of said valve member, said valve face being subjected to said fluid in said fluid passage and being adapted to engage said valve seat and stop the flow of fluid in said passage when said valve member is moved relative to said body; a secondary face on an opposite side of said valve, said secondary face having a larger area than said primary face and being subjected to the pressure of a fluid in said cavity; a secondary valve operable when open to establish communication between said passage and said cavity; and means operable by the flow of fluid in said passage to open said secondary valve after a predetermined amount of fluid has flowed through said passage.

10. In an automatic shut-off valve, the combination of: a body providing a fluid passage therethrough and a cavity therein; a valve seat in said fluid passage; a valve member carried by said body and slidable relative thereto; a primary valve face on one side of said valve member, said valve face being subjected to said fluid in said fluid passage and being adapted to engage said valve seat and stop the flow of fluid in said passage when said valve member is moved relative to said body; a secondary face on an opposite side of said valve, said secondary face having a larger area than said primary face and being subjected to the pressure of a fluid in said cavity; a secondary valve operable when open to establish communication between said passage and said cavity; a turbine runner rotated by the flow of fluid through said passage; and gear means operatively connecting said runner and said secondary valve for opening said secondary valve after a predetermined number of revolutions of said runner.

11. In an automatic shut-off valve, the combination of: a body providing a fluid passage therethrough and a cavity therein; a valve seat in said fluid passage; a valve member carried by said body and slidable relative thereto; a primary valve face on one side of said valve member, said valve face being subjected to said fluid in said fluid passage and being adapted to engage said valve seat and stop the flow of fluid in said passage when said valve member is moved relative to said body; a secondary face on an opposite side of said valve, said secondary face having a larger area than said primary face and being subjected to the pressure of a fluid in said cavity; a secondary valve operable when open to establish communication between said passage and said cavity; means operable by the flow of fluid in said passage to open said secondary valve after a predetermined amount of fluid has flowed through said passage; and means carried by said secondary valve for establishing communication between said cavity and the exterior of said body when said secondary valve is closed.

12. In an automatic shut-off valve, the combination of: a body providing a fluid passage therethrough and a cavity therein; a valve seat in said fluid passage; a valve member carried by said body and slidable relative thereto; a primary valve face on one side of said valve member, said valve face being subjected to said fluid in said fluid passage and being adapted to engage said valve seat and stop the flow of fluid in said passage when said valve member is moved relative to said body; a secondary face on an opposite side of said valve, said secondary face having a larger area than said primary face and being subjected to the pressure of a fluid in said cavity; a secondary valve operable when open to establish communication between said passage and said cavity; a turbine runner rotated by the flow of fluid through said passage; gear means operatively connecting said runner and said secondary valve for opening said secondary valve after a predetermined number of revolutions of said runner; and means carried by said secondary valve for establishing communication between said cavity and the exterior of said body when said secondary valve is closed.

In testimony whereof, I have hereunto set my hand at Los Angeles, California, this 7th day of October, 1929.

WALTER VAN E. THOMPSON.